United States Patent [19]

Hirano

[11] Patent Number: 5,414,645
[45] Date of Patent: May 9, 1995

[54] METHOD OF FAULT DIAGNOSIS IN AN APPARATUS HAVING SENSORS

[75] Inventor: Seiyo Hirano, Higashihiroshima, Japan

[73] Assignee: Mazda Motor Corporation, Hiroshima, Japan

[21] Appl. No.: 965,772

[22] Filed: Oct. 23, 1992

[30] Foreign Application Priority Data

Oct. 25, 1991 [JP] Japan .................................. 3-306605
Oct. 25, 1991 [JP] Japan .................................. 3-306606

[51] Int. Cl.⁶ .............................................. G06F 15/20
[52] U.S. Cl. ................................. 364/551.01; 395/905; 364/424.03; 371/15.1
[58] Field of Search ........................ 364/424.03, 424.04, 364/551.01; 395/900, 905, 913; 73/116, 117.2, 117.3, 118.1, 119 R; 371/15.1

[56] References Cited

U.S. PATENT DOCUMENTS 5,041,976 8/1991 Marko et al. .................... 364/424.03
5,079,759 1/1992 Kajiyama ............................ 370/13

FOREIGN PATENT DOCUMENTS 61-107436 5/1986 Japan .

OTHER PUBLICATIONS

Empirical and Functional Knowledge in an Expert System for Fault Diagnosis; G. Armano et al; IEEE; Dec. 31, 1988; pp. 109–114.

Primary Examiner—Michael Zanelli

[57] ABSTRACT

The relationships between part nodes, including all sensor nodes in an apparatus system are expressed by connecting relations and weighing factors indicating the correlation. Output signals of all the sensor nodes in the system are converted to a state quantity by a membership function using fuzzy reasoning. With a sensor as a starting point, the nodes which are sequentially connected are traced and state quantities of each node are determined. The state quantities of each node are unified in a subsystem comprising this apparatus system and the subsystem in which the value of the state quantity is large is inferred to be faulty.

16 Claims, 18 Drawing Sheets

| NODE 1 | NODE 2 | DIRECTION | COEFFICIENT |

FIG. 11

| NODE NAME | MEMBERSHIP VALUE |

FIG. 13

|  | X | Y | Z |
|---|---|---|---|
| SENSOR i | W | W | W |
| SENSOR j | W | W | W |
| SENSOR k | W | W | W |

FIG. 25

METHOD OF FAULT DIAGNOSIS IN AN APPARATUS HAVING SENSORS

BACKGROUND OF THE INVENTION

1. Field of the Invention

The present invention relates to a method of fault diagnosis in a system having a plurality of sensors and a plurality of functional parts which directly or indirectly relate to the sensors.

2. Description of the Related Art

In a complex system comprising a plurality of devices, electronic controlling of various devices has been developed along with the rapid advance of electronics. The advantage has been brought in improving reliability of the system by adopting the electronic controls, while there is the drawback that the electronic parts become a black box when there is something wrong with the system resulting in difficulty of locating failures.

To cope with this drawback, it has been disclosed that a fault diagnosis function is incorporated into a control system of vehicle by Japanese Kokai No. SHO 61-107436. In the prior art, predetermined fault diagnosis signals are outputted to each part from a control unit which controls the system, and it is judged to be faulty when a predetermined response signal corresponding to the fault diagnosis signals cannot be obtained.

In addition to such electronic controllers and sensors, such system has many actuator parts. In an automobile, for example, the parts are a stepping motor for driving a throttle, various solenoids for driving various members, and so on. These parts, sensors, actuators and electric wires which connect the sensors and actuators comprise a set of "functional parts".

Such functional part set can easily become a "black box", because these parts are mutually related.

For example, from the functional point of view, an engine comprises an engine body, air-intake subsystem, fuel supplying subsystem, ignition subsystem, exhaustion subsystem, which are mutually associated. If there is something wrong with the air-intake subsystem, the failure in the air-intake subsystem effects the main body of the engine and generates knocking or it further effects the exhaustion system resulting in increase of the temperature of the exhaustion gas. Therefore, even if abnormality in the exhaustion temperature is detected, it cannot be always concluded that the failure is occurring in the exhaustion system.

To cope with this problem, it has been studied that sensor information is patternized as fault diagnosis data based on the knowledge, attained by the experiences of mechanic engineers, and stored in a control unit in advance, and then, a pattern matching method is applied. However, failures which have never been experienced cannot be coped with by the conventional method, thus limiting applications of the diagnosis.

SUMMARY OF THE INVENTION

Accordingly, it is an object of the present invention to provide a fault diagnosis method capable of locating failures flexibly, but with a high probability, in a system in which a plurality of sensors and parts associate each other.

It is another object of the present invention to infer the fault by performing fuzzy reasoning on a fault state.

It is another object of the present invention to enable a quantity of a fault state of an electronic part to be expressed utilizing a microcomputer or mechanically functional part, which is difficult to be fault-quantized, in a form of the product of the quantity of the fault state of a node connected to the electric part and a weighting factor.

It is another object of the present invention to prevent the operations on the fault state quantity from being repeatedly performed in the case where part nodes forming a loop.

It is another object of the present invention to ignore the operation of the fault state of the sensors in which the value indicating a low degree of abnormality thus performing the operation at a high speed.

It is another object of the present invention to perform the determination of the fault state quantity from the sensor node in which the value indicating a high degree of abnormality and to enable specification of the failed node at an early stage.

It is another object of the present invention to suggest a fault diagnosis method to improve diagnosis accuracy by adding the fault inference based on an output signal of a sensor to the fault inference based on experience so that an uncertainty of the inference result by the experimental rules is compensated.

It is another object of the present invention to perform fault diagnosis processing by summing the fault inference based on the output signal of sensor and the fault inference based on the experience in order to locate all failures.

It is another object of the present invention to enable narrowing down of the probable failures by inferring the common results of the fault inference based on the output signal of the sensor and the fault inference based on the experience as a fault.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 11 illustrates the structure of the rules stored in the storage 12 which is commonly referred in the first to fourth embodiment;

FIGS. 13 and 14 are diagrams illustrating the results which can be attained at the steps S2 and S3 of the controlling procedure of the first embodiment;

FIG. 25 is a diagram explaining the structure of the second knowledge in the second embodiment;

DESCRIPTION OF THE PREFERRED EMBODIMENTS

Preferred embodiments of the present invention which are applied to automotive vehicles will now be described in detail in accordance with the accompanying drawings.

Automotive vehicle uses numerous sensors, highly developed electronic parts (parts to which a microcomputer is applied), and actuators. These electronic parts directly or indirectly associate with the sensors and actuators. The fault diagnosis method performs "fault inference" on various parts, correlates the results of the "fault inference" on the parts, and specifies a faulty point which is determined to have a strong possibility of being failed in accordance with the correlation result of the numerous inference results. Accordingly, since the method is accompanied with fuzziness, it adopts "fuzzy reasoning".

First Embodiment

Figure 1:
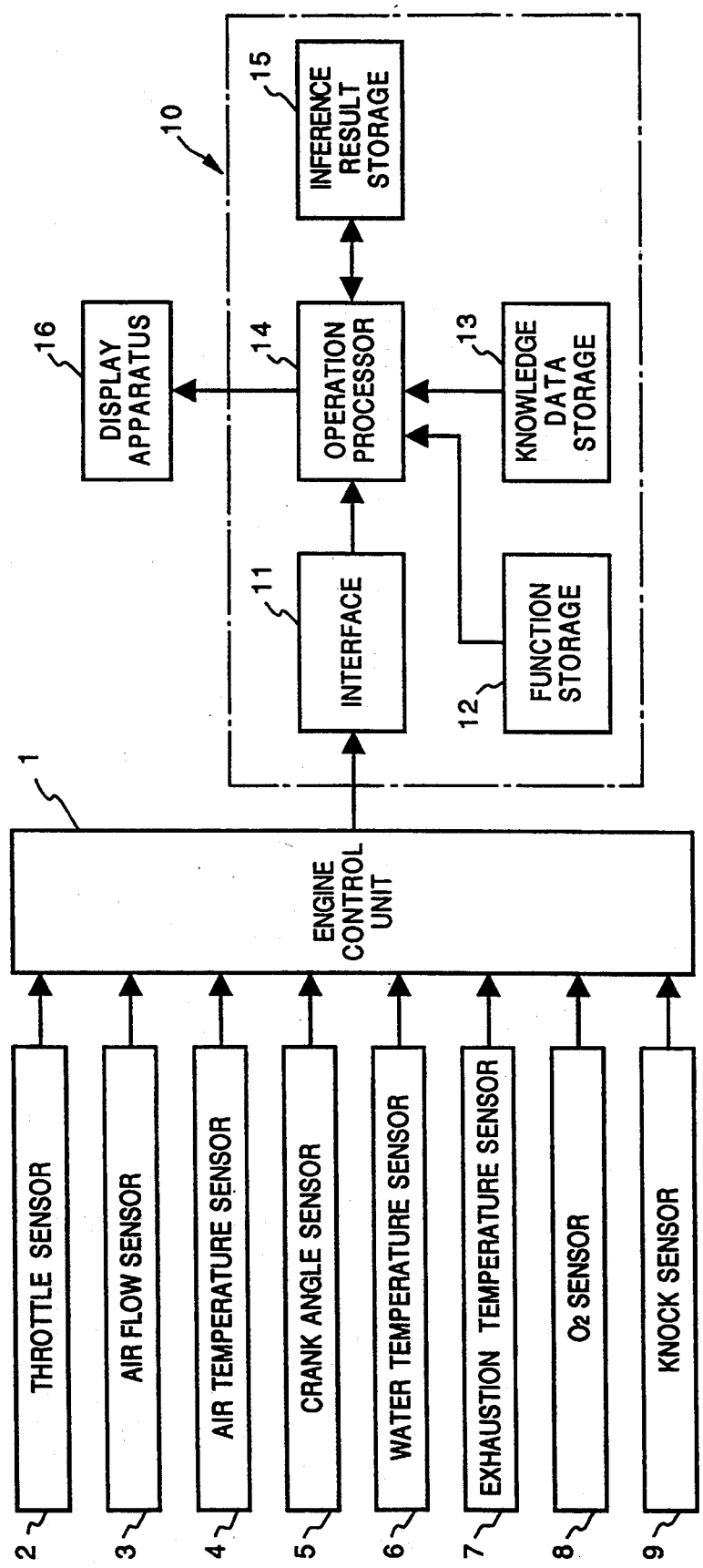
FIG. 1 is a block diagram illustrating the fault diagnosis system in the first embodiment according to the present invention.

FIG. 1 shows a relationship between a fault diagnosis unit 10 to which the fault diagnosis method of the present invention is applied and an engine control system to be diagnosed.

As shown in FIG. 1, a vehicle carries an engine control unit 1 which inputs a throttle opening signal detected by a throttle sensor 2, a signal detected by an air flow sensor 3, an inhaled air temperature signal detected by an air temperature sensor 4, crank angle signal detected by a crank angle sensor 5, an engine water temperature signal detected by a water temperature sensor 6, an exhaustion temperature signal detected by an exhaustion temperature sensor 7, and an air-fuel-ratio signal detected by an Oxygen ($O_2$) sensor 9. The engine control unit 1 transfers the signals to the fault diagnosis unit 10.

The fault diagnosis unit 10 comprises an interface 11 for communication, a function-storage 12 having previously stored functions ("membership functions") indicating degrees of abnormality corresponding to the outputs of the sensors 2–9, a knowledge data storage 13 having previously stored knowledge data for fault diagnosis, an operation processor 14 for performing a fault inference based on the sensor information obtained through the interface 11, an inference result storage 15 for storing inference results of the operation processor 14. A display apparatus 16 for fault diagnosis display is connected to the fault diagnosis unit 10.

The function indicating the degree of sensor abnormality stored in the function storage 12 will be described below. As mentioned earlier, fuzzy reasoning is used in the embodiments. Therefore, a degree of abnormality in a sensor output (probability of sensor's or subsystem's fault) can be expressed by a membership function. FIGS. 2–9 are the membership functions for the output signal levels of the throttle sensor 2, air flow sensor 3, air temperature sensor 4, crank angle sensor 5, water temperature sensor 6, exhaustion temperature sensor 7, $O_2$ sensor 8, and knock sensor 9, respectively.

Figure 2:
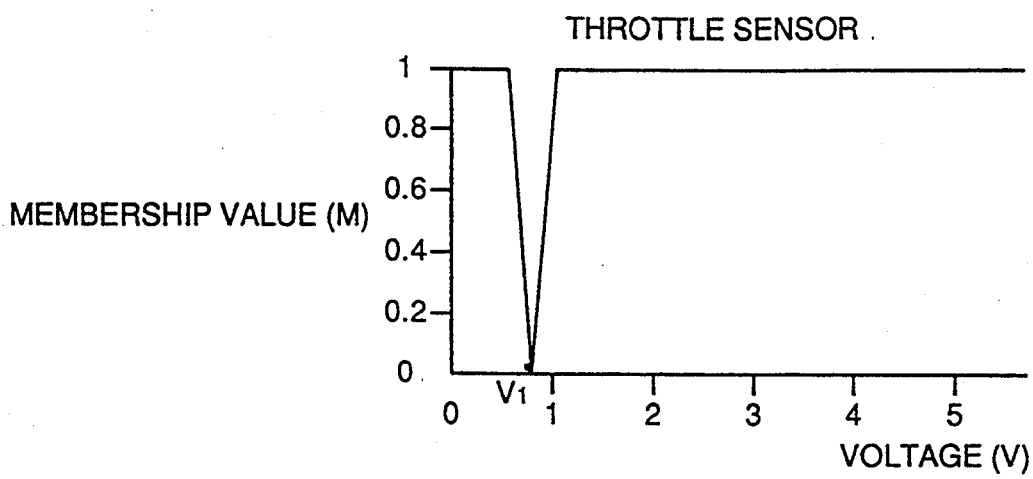
FIG. 2 is a characteristic diagram illustrating an example of the membership function indicating a degree of failure to the output state of the throttle sensor which is commonly referred in the first to fourth embodiment.
Figure 3:
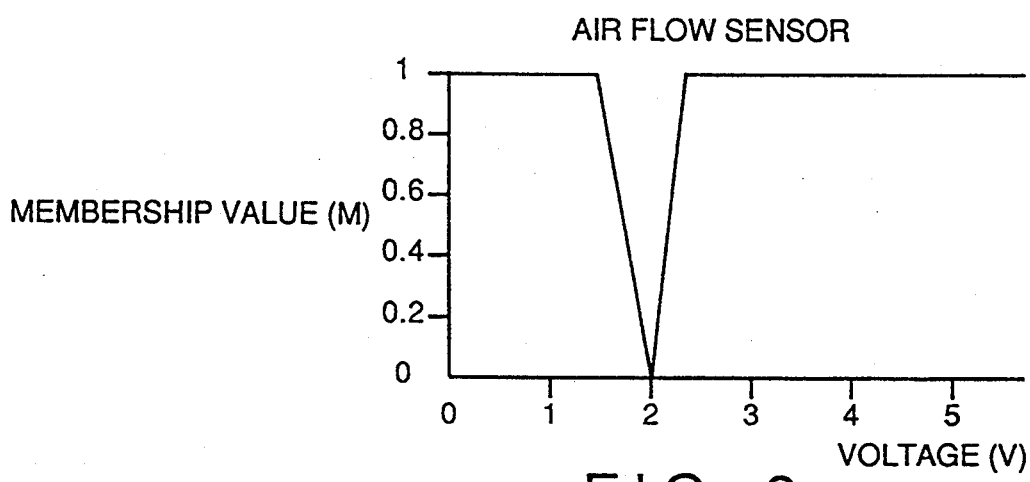
FIG. 3 is a characteristic diagram illustrating an example of the membership function indicating a degree of failure to the output state of the air flow sensor which is commonly referred in the first to fourth embodiment.
Figure 4:
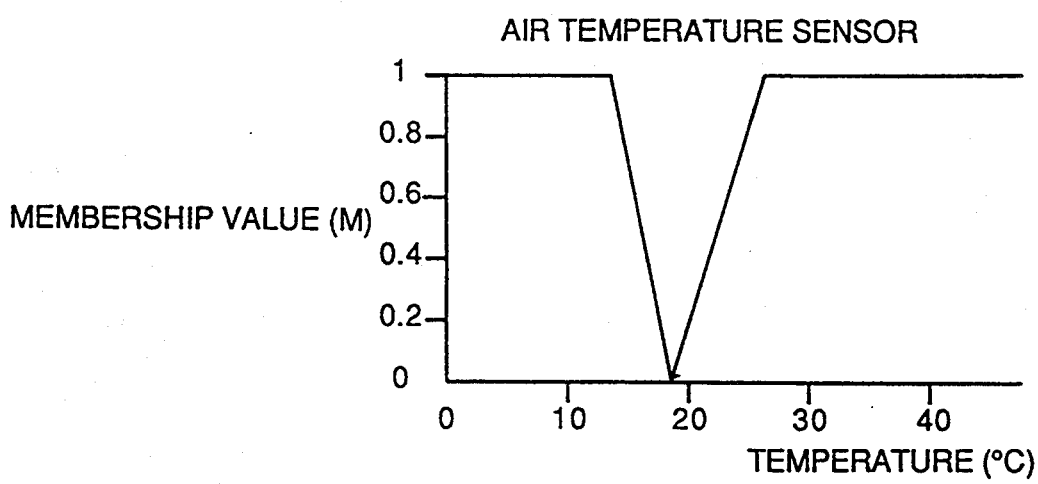
FIG. 4 is a characteristic diagram illustrating an example of the membership function indicating a degree of failure to the output state of the air-intake temperature sensor which is commonly referred in the first to fourth embodiment.
Figure 5:
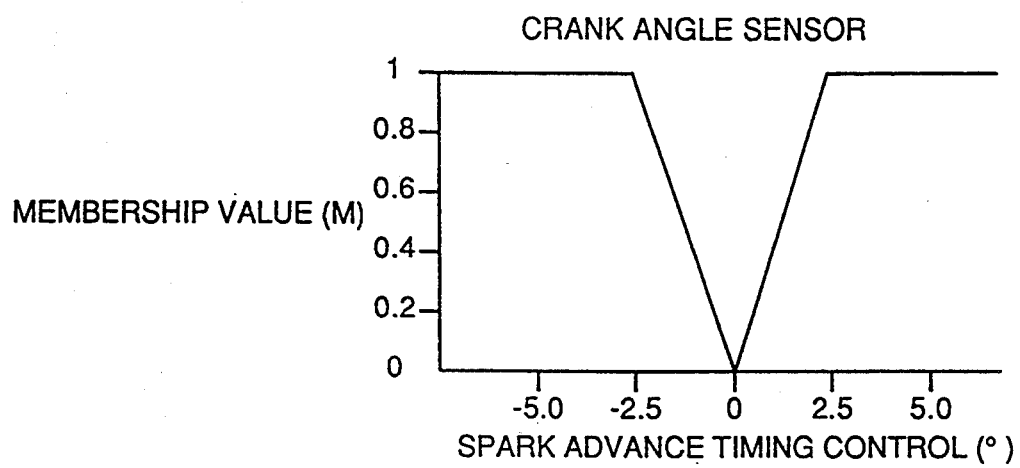
FIG. 5 is a characteristic diagram illustrating an example of the membership function indicating a degree of failure to the output state the crank angle sensor which is commonly referred in the first to fourth embodiment.
Figure 6:
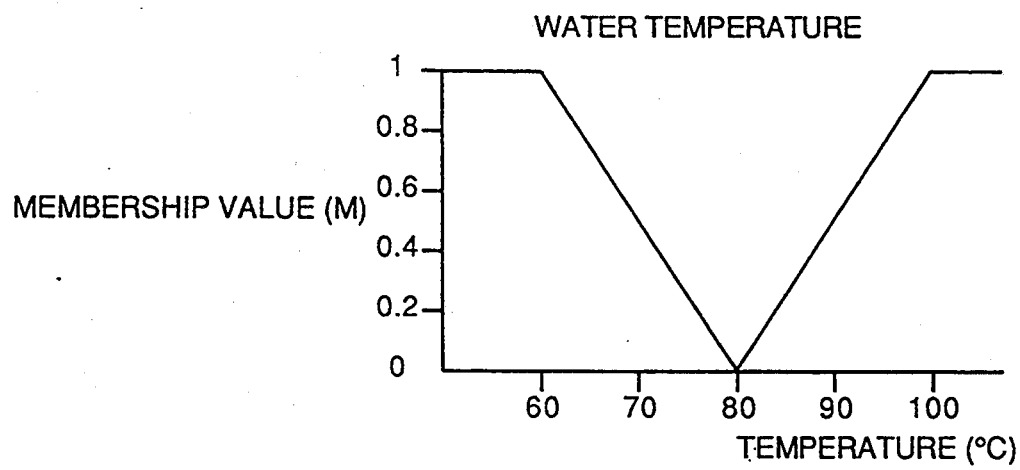
FIG. 6 is a characteristic diagram illustrating an example of the membership function indicating a degree of failure to the output state of the water temperature sensor which is commonly referred in the first to fourth embodiment.
Figure 7:
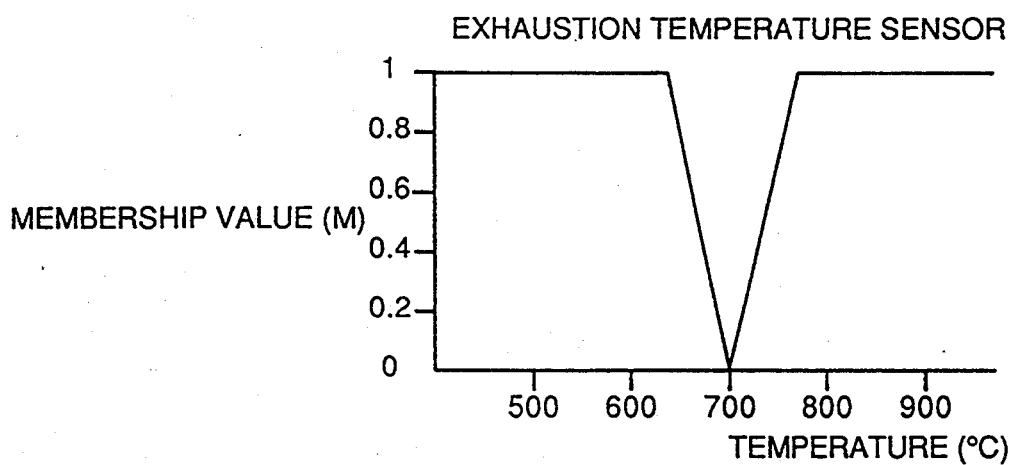
FIG. 7 is a characteristic diagram illustrating an example of the membership function indicating a degree of failure to the output state of the exhaustion temperature sensor which is commonly referred in the first to fourth embodiment.
Figure 8:
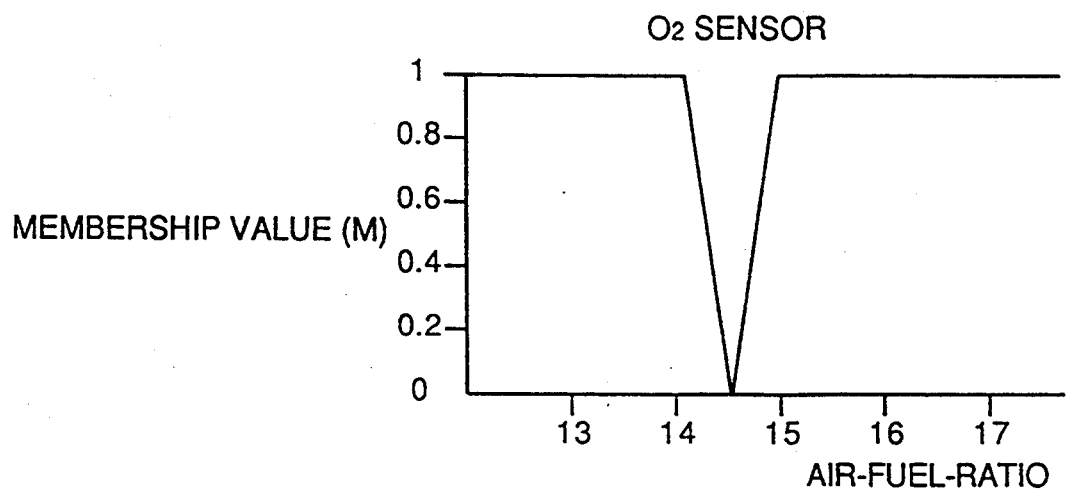
FIG. 8 is a characteristic diagram illustrating an example of the membership function indicating a degree of failure to the output state of the $O_2$ sensor which is commonly referred in the first to fourth embodiment.
Figure 9:
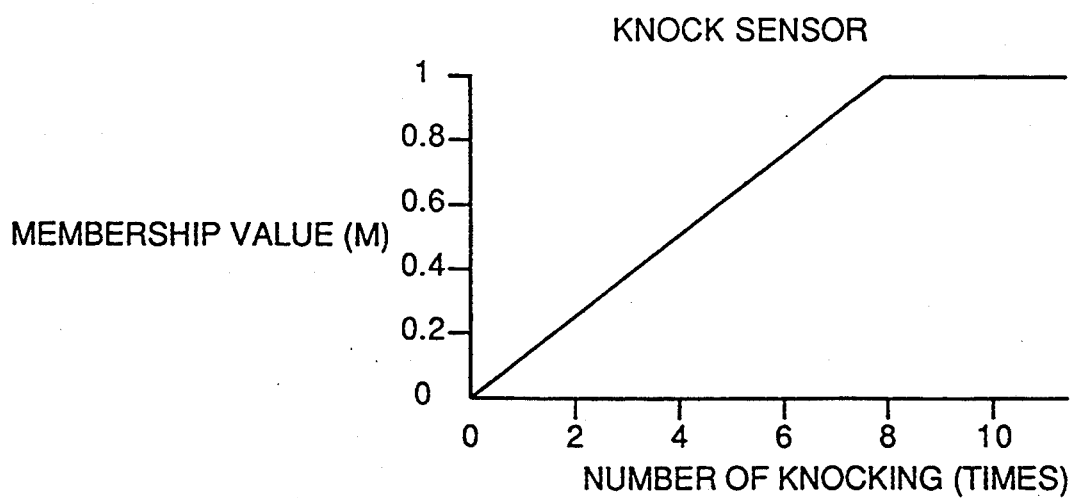
FIG. 9 is a characteristic diagram illustrating an example of the membership function indicating a degree of failure to the output state of the knock sensor which is commonly referred in the first to fourth embodiment.

For example, the relationship between the output voltage of the throttle sensor 2 and the corresponding membership values indicating a degree of abnormality of the sensor is set as shown in FIG. 2. There is a tendency that the membership function suddenly increases at both sides of the predetermined value $V_1$. When the output voltage is extremely high or low, the membership value becomes "1" indicating a high probability that the sensor 2 fails.

However, in reality, the sensors seldom completely fail where the output voltage of the sensor is zero or abnormally high, but the faulty state reveals when approximately a half level of the normal voltage is outputted. Furthermore, it is easy to diagnose a solid fail of sensors or micro computers. It is very difficult to locate a faulty point in a plurality of functional parts where the functional parts are a mechanical part assembly, because it is difficult to quantize effects of one mechanical functional part to other functional parts.

To express fuzziness of a faulty state of the sensors or functional parts, the membership function of fuzzy reasoning which can obtain any value between "0" and "1" is adapted.

Figure 10:
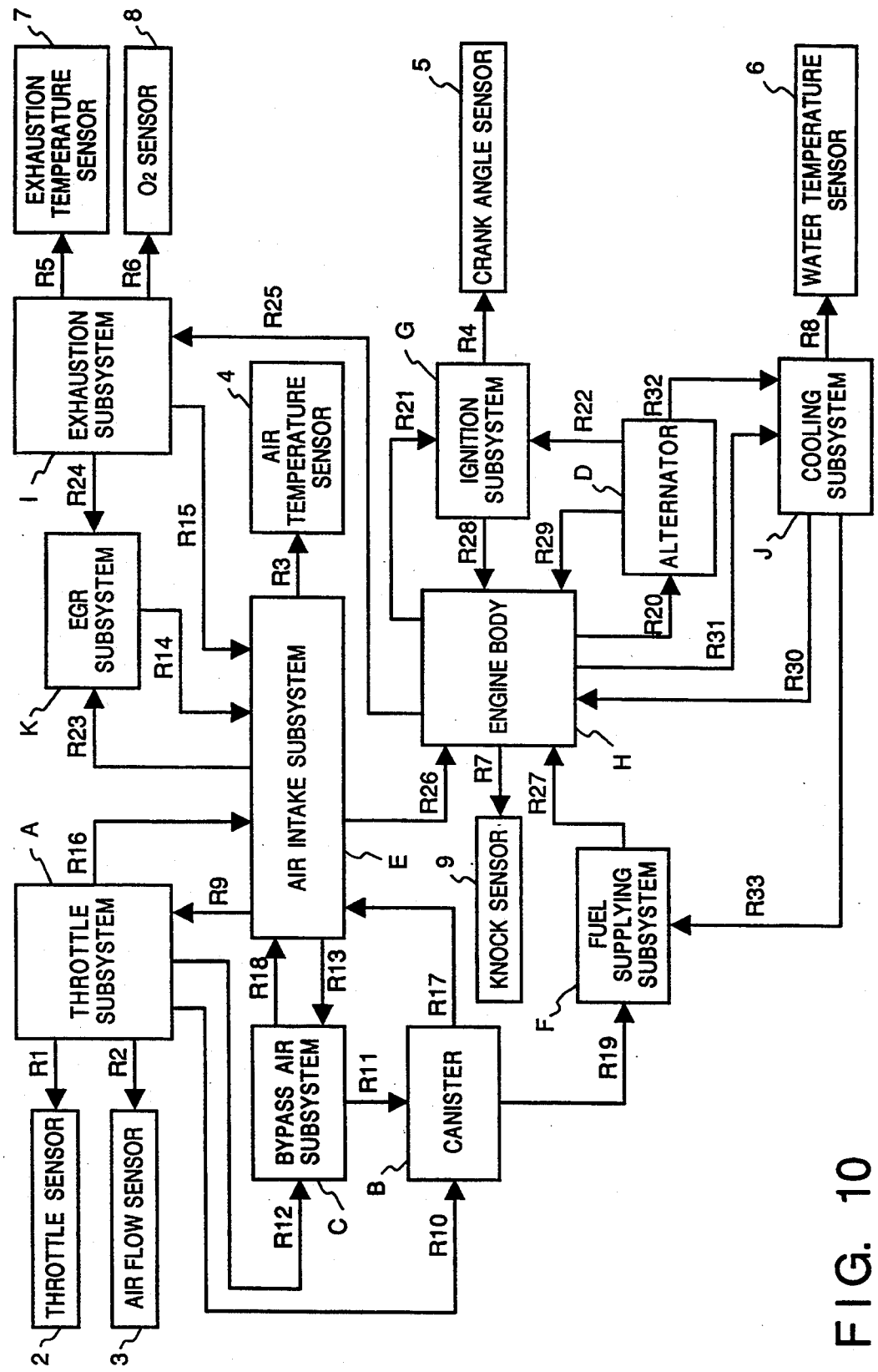
FIG. 10 is a correlation diagram showing the structure model of the engine which is commonly referred in the first to fourth embodiment.

FIG. 10 is a block diagram illustrating the engine system from the point of view of functions of the engine control unit 1 to be controlled by it. The engine comprises a throttle subsystem A, canister B, bypass-air subsystem C, alternator D, air-intake subsystem E, fuel supplying subsystem F, ignition subsystem G, main body of the engine H, exhaustion subsystem I, cooling subsystem J, and EGR subsystem K. The throttle subsystem A includes a throttle, a controller controlling a throttle opening by a stepping motor and an intake air pipe. The bypass air subsystem C includes an idle speed control (ISC) valve, an ISC controller and a bypass air pipe.

Figures 15, 16:
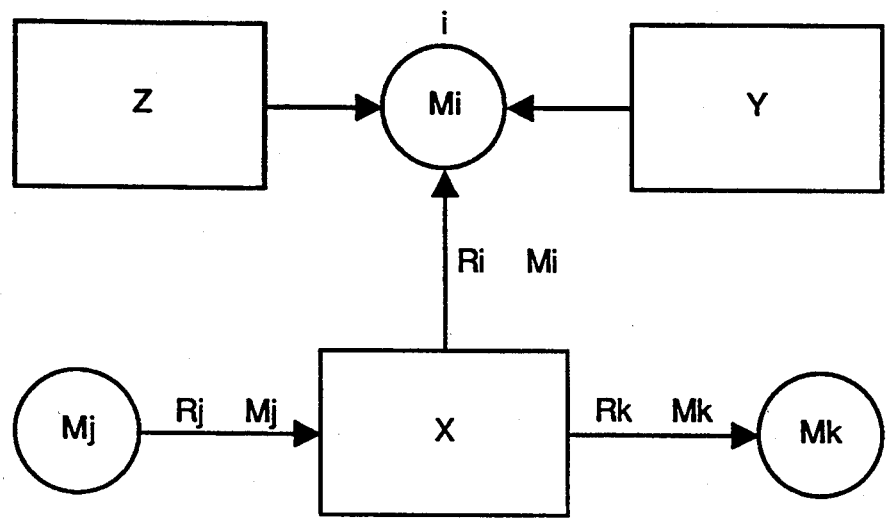
FIG. 15 is a diagram explaining the relationship between the subsystems X, Y, Z and the three sensor nodes i, j, k.
FIGS. 16, 17 and 18 are diagrams of the results which can be attained at step S6 in the controlling procedure of the first embodiment.

These subsystems are related via the above-described sensors. The subsystems and sensors are referred to as "nodes". In FIG. 10, the relationships among nodes are expressed in "arc" and each arc is called a "rule," expressed by R. Each rule comprises a "connecting direction", "identifier" of the connected nodes, and "correlation coefficient" which is to be described later. These rules are stored as shown in FIG. 16.

The sensors and subsystems are directly or indirectly connected to each other. The throttle sensor 2 directly connects to the throttle subsystem A, but indirectly connects to the EGR subsystem K through the throttle subsystem A and air-intake subsystem E. The connecting relation changes depending on their influence upon each other. For example, the result of the throttle opening control by the throttle subsystem A appears on a throttle opening angle (observed by the output signal of the sensor 2) and on an output signal of the air flow sensor 3 as a result of the amount of air changed by the opening control. It is empirically known that the throttle opening control by the throttle subsystem A has more effect on the output signal of the throttle opening sensor than the output signal of the air flow sensor 2. If there is any difference in "strengths" of the connecting relations (tightnesses of the relationship) of nodes having a node therebetween, the tightness needs to be reflected in the rules, because it relates to the effectiveness in any fault. Tightness is expressed by the above-described "correlation coefficients".

The correlation coefficients are shown in the following table.

| RULE | CORRELATION COEFFICIENT |
| --- | --- |
| R1 | 0.88 |
| R2 | 0.76 |
| R3 | 0.85 |
| R4 | 0.87 |
| R5 | 0.83 |
| R6 | 0.81 |
| R7 | 0.80 |
| R8 | 0.84 |
| R9 | 0.59 |
| R10 | 0.20 |
| R11 | 0.45 |
| R12 | 0.42 |
| R13 | 0.72 |
| R14 | 0.56 |
| R15 | 0.40 |
| R16 | 0.75 |
| R17 | 0.31 |
| R18 | 0.32 |
| R19 | 0.48 |
| R20 | 0.54 |
| R21 | 0.44 |
| R22 | 0.49 |
| R23 | 0.71 |
| R24 | 0.65 |
| R25 | 0.89 |
| R26 | 0.70 |
| R27 | 0.74 |
| R28 | 0.73 |
| R29 | 0.48 |
| R30 | 0.43 |
| R31 | 0.53 |
| R32 | 0.79 |
| R33 | 0.51 |

The knowledge data storage 13 stores connecting relations including correlation coefficients as shown in FIG. 11. In FIG. 11, the connecting direction of the node "1" and node "2" can be "→", "←", or "↔".

For example, the throttle sensor 2 (node 1) which is effected by the throttle subsystem A and the throttle subsystem A itself which effects the throttle sensor 2 (node 2) are connected by the rule R1 in which the origin is the throttle subsystem A. Correlation coefficient value (0.88) indicating the correlation of those is retrievably stored in the first knowledge data storage 13. The correlation coefficient value corresponding to the rule $R_2$ indicating the relationship between the throttle subsystem A and air flow sensor 3 is 0.76. These correlation coefficient values can be retrieved from the storage 13.

Procedure for Fault diagnosis

The fault diagnosis processing which is performed by the fault diagnosis unit 10 will be described along with the flowchart in FIG. 12.

The operation processor 14 in the fault diagnosis unit 10 reads the output signal values of the all sensors through the interface 11 at step S1 and converts the signal values to the membership values M ... M according to the corresponding membership function (FIGS. 2–9) at step S2. For example, if the output voltage indicated by the signal from the throttle sensor 2 is two (2) volts, "1" is selected as a membership value M indicating the degree of abnormality according to the relationship of FIG. 2. Consequently, obtained is a list of the combination of the node names and the corresponding membership values as shown in FIG. 13.

Figure 14:
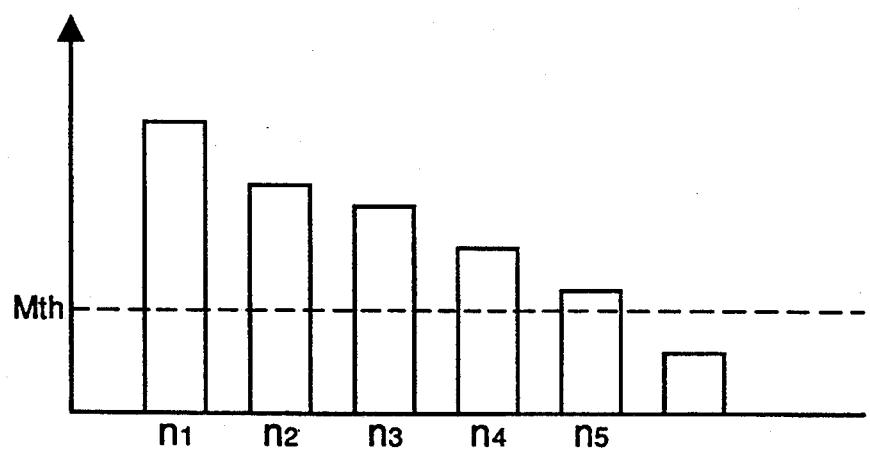

Subsequently, the operation processor 14 executes step S3 where sorting operation is performed to the node list of FIG. 13 in the descending order with the reference to the membership value M. That is, the membership values are compared and rearranged in descending order in the list. For example, when a list for sensors $n_1$, $n_2$, $n_3$, ... is rearranged, the result comes out as shown in FIG. 14.

In the procedure after step S4, an inference operation on the probability of fault occurrence is performed for all the subsystems which are included in the objective system and for all the sensors. The loop of S6→S7→S8→S9→S10→S6 operates an "inference value R" on all of the groups to which one sensor belongs to. The loop of S4→S5→S6→S7→S10→S4 is a processing operation which calculates the above "inference value R" on the all sensors.

That is, at step S4, the operation processor 14 judges whether or not the inference processing of the fault occurrence has been completed on the all sensors. If it is judged as "NO" at step S4, the control proceeds to step S5 where it is judged whether or not the maximum membership value $M_{max}$ among the membership values M ... M, which have been obtained for one sensor and rearranged at step S3, is larger than a predetermined threshold value $M_{th}$ which is minimum. Since the sensor the membership value of which is less than $M_{th}$ has little probability that the sensor fails, if the judgement at step S5 is "YES", a predetermined inference processing is executed at step S6. Each sensor node is arranged in the descending order with respect to membership value as shown in FIG. 14. Therefore, in a case where the sensor indicating a membership value which is smaller than $M_{th}$ is found in the process of the loop S4→S5→S6→S7→S8→S9→S10→S4, there is no need for performing the process in steps S4→S5→S6→S7→S10→S4 for the remaining sensors, and the control proceeds to step S11.

More particularly, what relates to the throttle sensor 2 is the subsystem A according to the correlation model of FIG. 10. Therefore, if the membership value of the sensor 2 is determined to be $M_2$, the inference value R of the subsystem A is a value obtained by multiplying the membership value $M_2$ by the correlation coefficient in accordance with the rule R1. That is, the inference value R of the subsystem A is "0.88 × $M_2$" because the correlation coefficient of the rule R1 is "0.88".

Then, the operation processor 14 judges whether or not the inference value R is larger than the reference value $R_{th}$ at step S7, and if it is judged as "YES", the process proceeds to step S8 where the inference value R obtained at step S6 is stored in a result table provided for every block (subsystem) in the inference result storage 15. At step S9, a next rule is searched and the process returns to step S6 where the inference processing on the next rule is repeated.

FIG. 15 shows the formation of the "inference value R" of the failure of a subsystem X in the case where the subsystem X effects the three sensor nodes (i, j, k). If the membership values of the nodes (i, j, k) are $M_i$, $M_j$, $M_k$, and the coefficients of the rule i, j, k are $R_i$, $R_j$, $R_k$, the "inference value R" of the failure of the system X can be expressed by:

$$M_i * R_i, M_j * R_j, M_k * R_k$$

At step S7, if the inference value R is smaller than the reference value $R_{th}$, a search for other correlation paths is made at step S9. If the judgement is YES at step S10, the process returns to step S6 where the inference processing is continued. In the correlation model of FIG. 10, the process goes through a series of correlation paths whose ending point is the throttle sensor 2. In this case, when the inference processing which started with a particular sensor is found to use the same (once used) rule, it means that the group of the inference operations to the pertinent sensor has been completed at that point. Accordingly, avoidance of using the same rule by different subsystems is controlled. Taking an example of the throttle subsystem A and air-intake subsystem E. In the case where the rule $R_9$ is used in the process of attaining the inference value of the air-intake subsystem A, the rule $R_9$ is not used again. In this way, the infinite loop is avoided and the time required for operation is shortened. At the same time, the error accumulated by needless repetition of the operations can be avoided.

When the operation processor 14 judges that there is no other correlation path at step S9, the process returns to step S4 where it is judged whether or not the inference processing on the all sensors has been completed. At step S5, the inference processing is sequentially executed from the larger membership value M until the judgement at step S4 becomes YES or the membership value M becomes smaller than the minimum threshold value $M_{th}$.

Summarizing the operation in steps S6–S10, the searching operation of nodes which starts at a sensor node is performed by tracing each "arc" of the node in the reverse direction. For example, as for the node of the throttle sensor 2, search is performed starting from the sensor node 2 and reaches the air intake subsystem E along with R1 and R9. The air intake subsystem E has 5 rules which can be traced, R16, R14, R15, R17 and R18. If R18 is taken, the searching operation reaches the bypass air subsystem C. The operation continues along R12 and reaches the throttle subsystem A. Although the throttle subsystem A has R9 which can be traced, since R9 has been already used, the searching operation is temporarily terminated and then the operation for the sensor node 2 is restarted at the air intake subsystem E which has other traceable rules. If R14 is taken, the operation reaches the EGR subsystem K which has two traceable rules, R23 and R24. If R23 is taken, it is memorized that R24 must be traced later and then the operation is restarted to reach the air intake subsystem E which has rules R16, R17 and R15. The above described searching operation including the calculation of inference values R is performed for every sensor. In one searching operation with respect to one sensor, a rule which has been traced previously is not traced. In other words, a rule which has been traced with respect to one sensor can be traced for a searching operation with respect to another sensor. Thus, a list of inference values R's for each sensor is obtained.

The searching operation may be time consuming. In this regard, if the searching operation is designed to be terminated when it is found during the operation that all the traceable rules have very small coefficients, the operation can be done more quickly.

Figure 17:
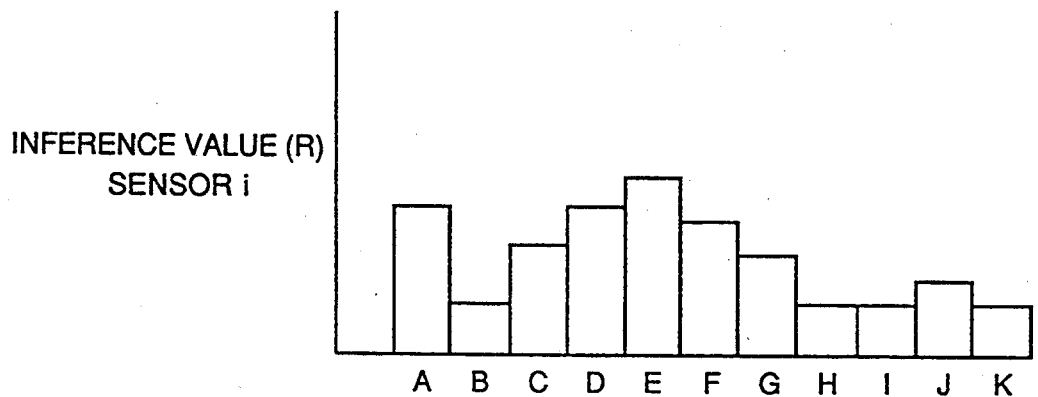
Figure 18:
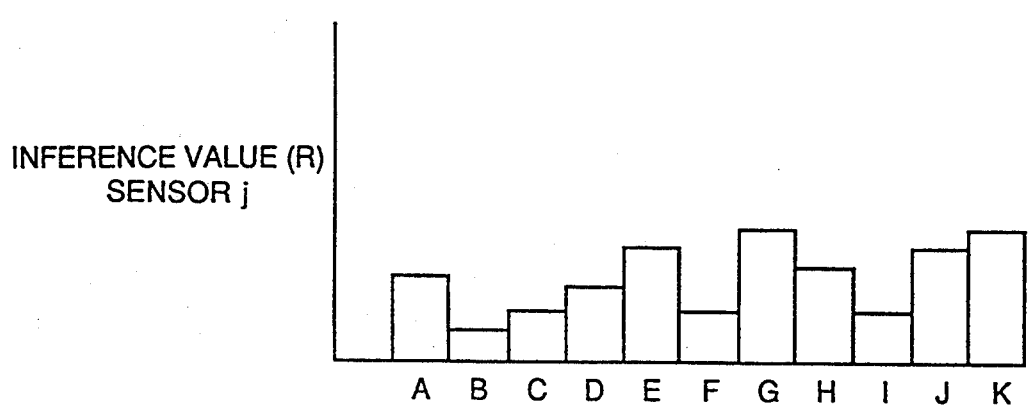
Figure 19:
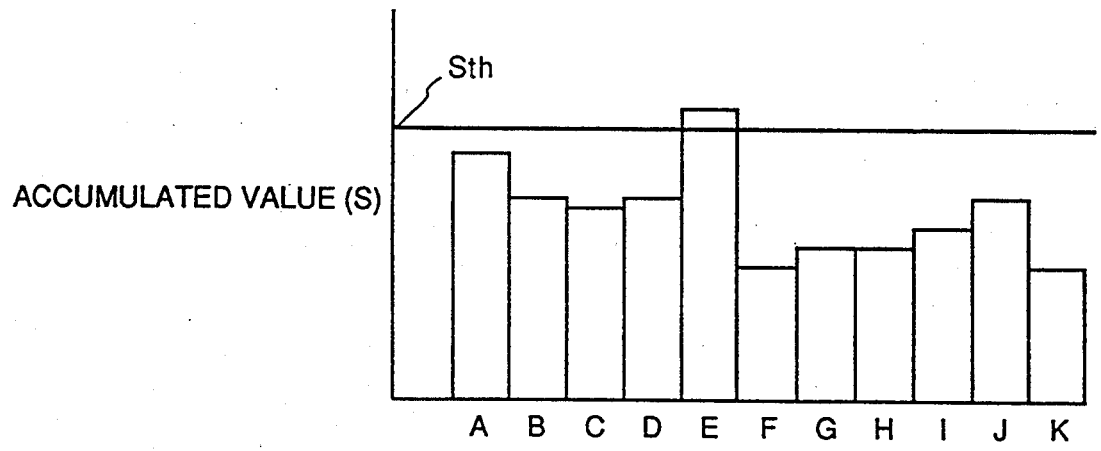
FIG. 19 is a probability diagram illustrating an example of the final result table including the final inference result.

As shown in FIG. 16, from the above processing, the "inference value R" of the failure between a sensor node and subsystem node is operated for every sensor node. Since the example of FIG. 15 described the case where there are three subsystems, X, Y, Z, FIG. 16 illustrates the relationships between sensor nodes i, j, k and the subsystems. The inference values on every subsystem (block) on each sensor i, j are indicated in FIGS. 17 and 18.

Figure 12:
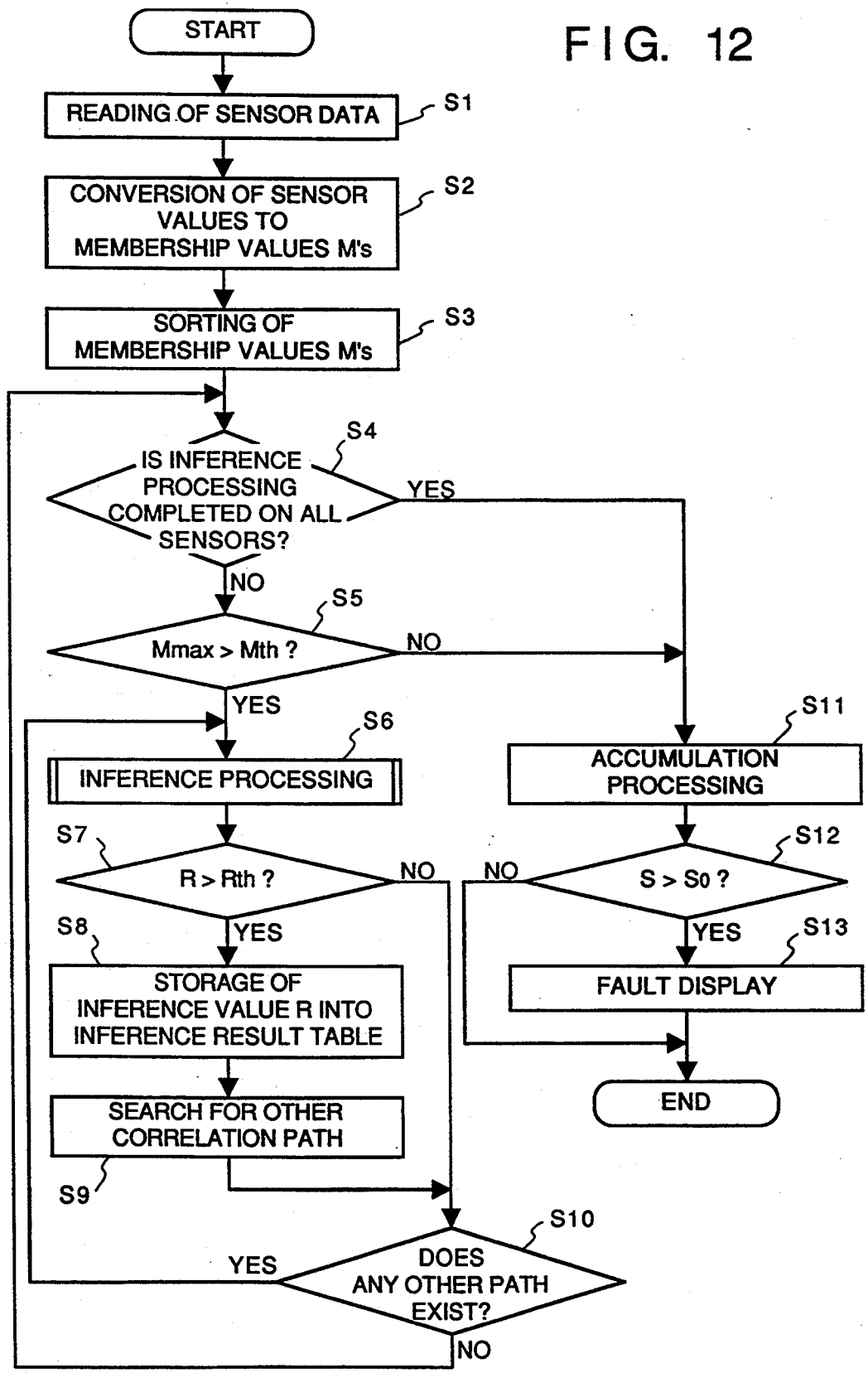
FIG. 12 is a flowchart illustrating the fault diagnosis processing according to the first embodiment.

Returning to the flowchart of FIG. 12, the operation processor 14 executes a predetermined accumulation processing at step S11. That is, the inference values R . . . R on each sensor which is stored as FIG. 16 is added in every block and the sum is added in every block to the final result table.

At step S12, the operation processor 14 judges whether or not the accumulated value S . . . S stored in the final result table at step S12 is larger than the reference value $S_{th}$ and, if the judgment is YES, the process proceeds to step S13 where the result of the fault diagnosis is displayed on the display apparatus 16. More specifically, if the accumulated value S of the air-intake subsystem E is the largest and is larger than the reference value $S_{th}$, it is diagnosed that the air-intake subsystem E has failed and the display informing this is made on the display apparatus 16.

Furthermore, in the case where the accumulated value S is judged as a fault, the diagnostic system may be arranged to enter a fail safe mode.

Application of the First Embodiment

Figure 20:
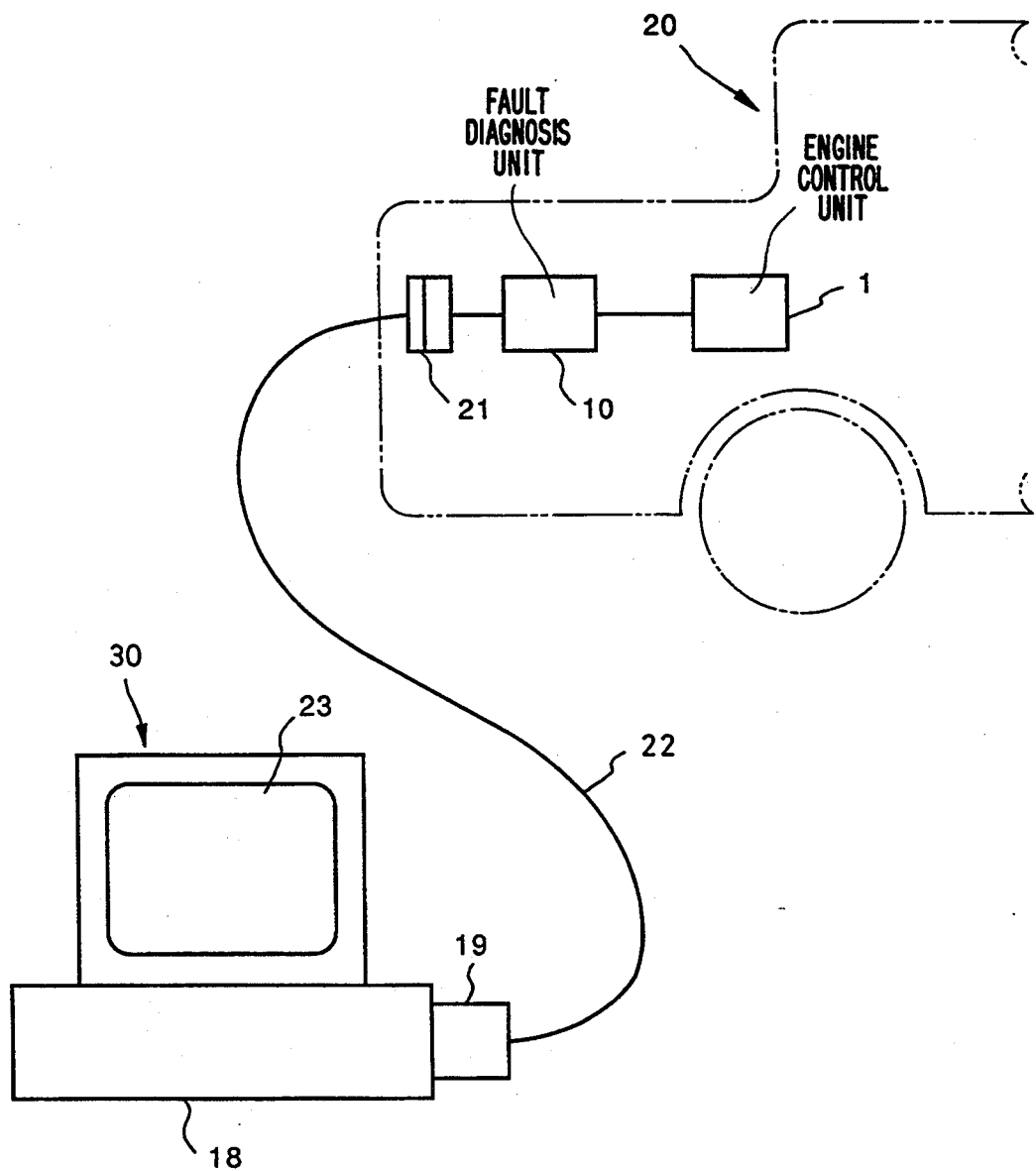
FIG. 20 is a model diagram illustrating an example in a case where the fault diagnosis result is monitored by the external monitor.

As shown in FIG. 20, in a service area for automobiles, the present system can be arranged in which a personal computer 30 is provided, and the fault diagnosis unit 10 which is connected to the engine control unit 1 of the vehicle 20 can be communicated through a connector 21, a cable 22 and an interface 19 attached to the main body 18 of the computer 30. Then, the result of fault diagnosis is displayed on the display apparatus 23.

Figure 21:
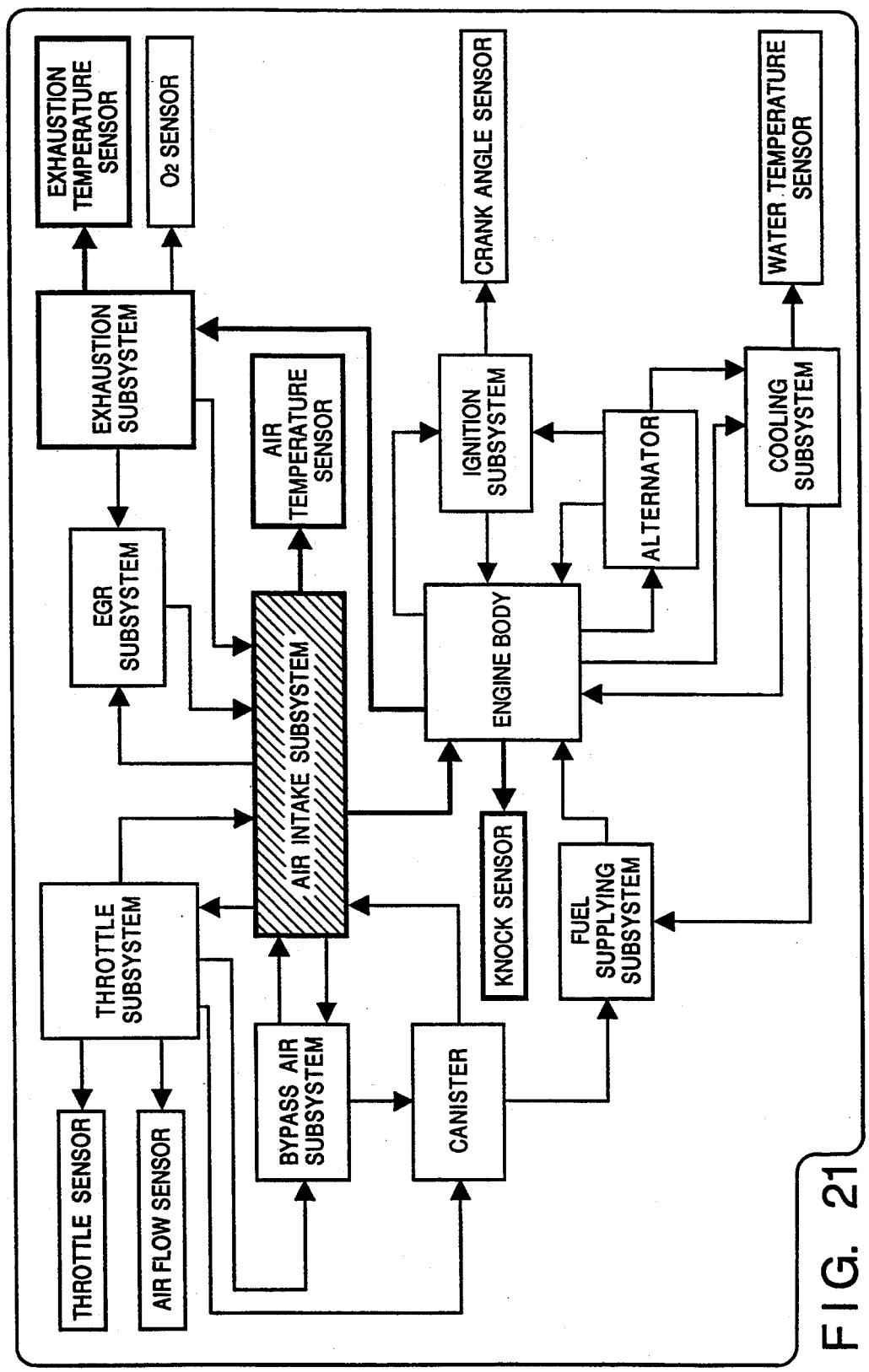
FIG. 21 is a model diagram illustrating an example of display of the fault diagnosis result.

In this application, in the case where degrees of abnormality in the exhaustion temperature sensor 7, air temperature sensor 4, and knock sensor 9 are large and it is diagnosed that there is something wrong with the air-intake subsystem E, as shown in FIG. 21, the parts which are assumed to have failed are displayed in the negative video mode, and all the paths to the sensor from the subsystem E are displayed in a bold line on the display 23. Accordingly, the result of the fault diagnosis can be understood at a single glance.

Figure 22:
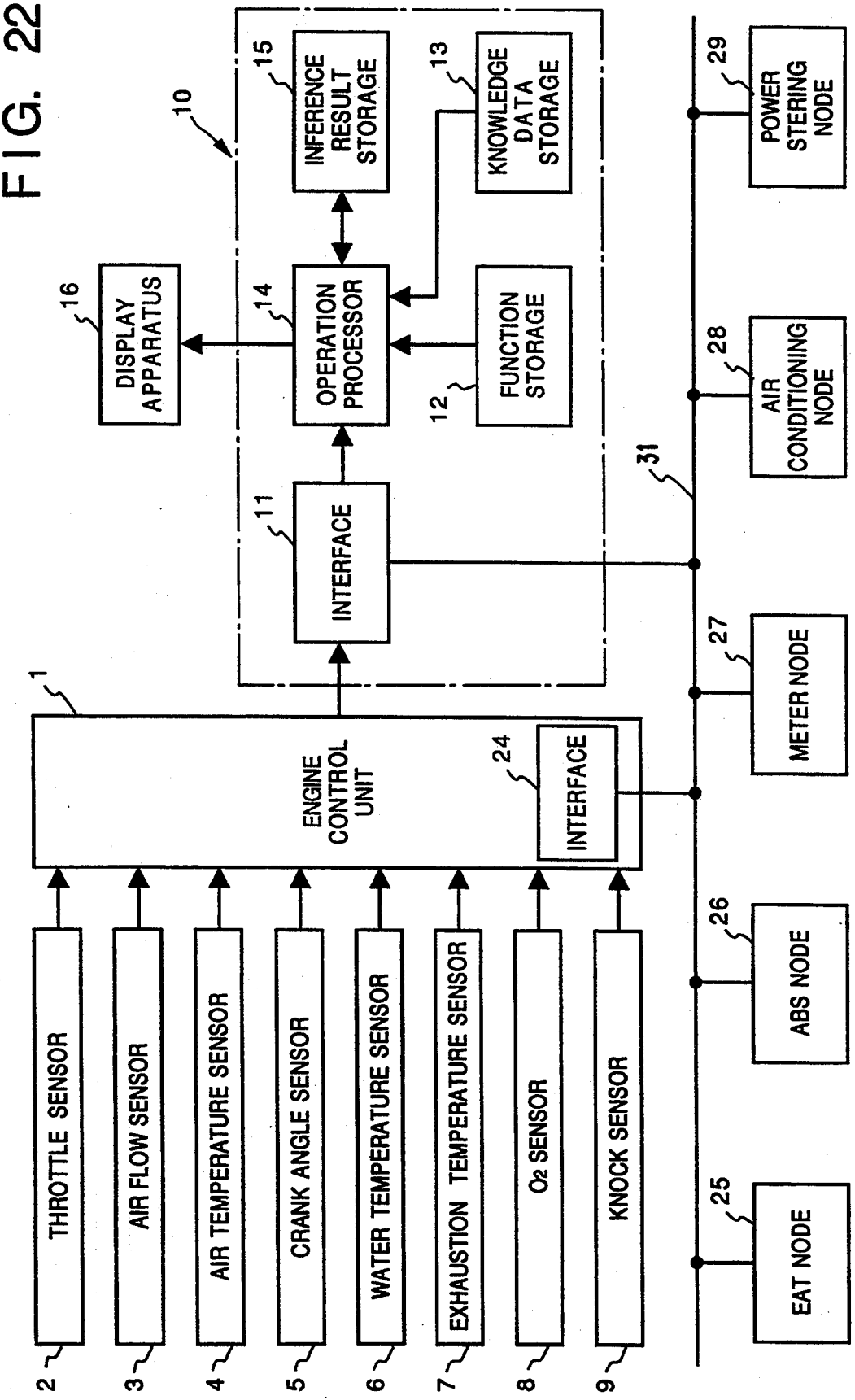
FIG. 22 is a block diagram of the fault diagnosis system illustrating an example of application of the first embodiment.

Furthermore, as shown in FIG. 22, an interface 24 for communication can be provided in the engine control unit 1 and connected to the multiplex transmission path 31 which connects to a node 25 for EAT (electronically automatic transmission), a node 26 for ABS (anti-lock brake system), a node 27 for various meters, a node 28 for air conditioning device, and a node 29 for power steering. Furthermore, the interface unit 11 included in the fault diagnosis unit 10 connects to the multiplex transmission path 31 and various data for fault diagnosis can be obtained through the path 31. In this way, the fault diagnosis on the whole vehicle can be accurately and widely performed. In this regard, data format which flows on the path 31 is disclosed in U.S. Pat. No. 5,079,759 which is assigned to the assignee of the present application and which is hereby incorporated into the present application by reference. More specifically, the searching operation in accordance with the flowchart of FIG. 12 is performed by starting with sensor nodes. In the application to the system as shown in FIG. 22, the diagnosing apparatus 10 collects all sensor data which were calculated in the associated nodes through the path 31, converts the data to membership values, and then performs a searching operation similar to that of FIG. 12.

Second Embodiment

Figure 23:
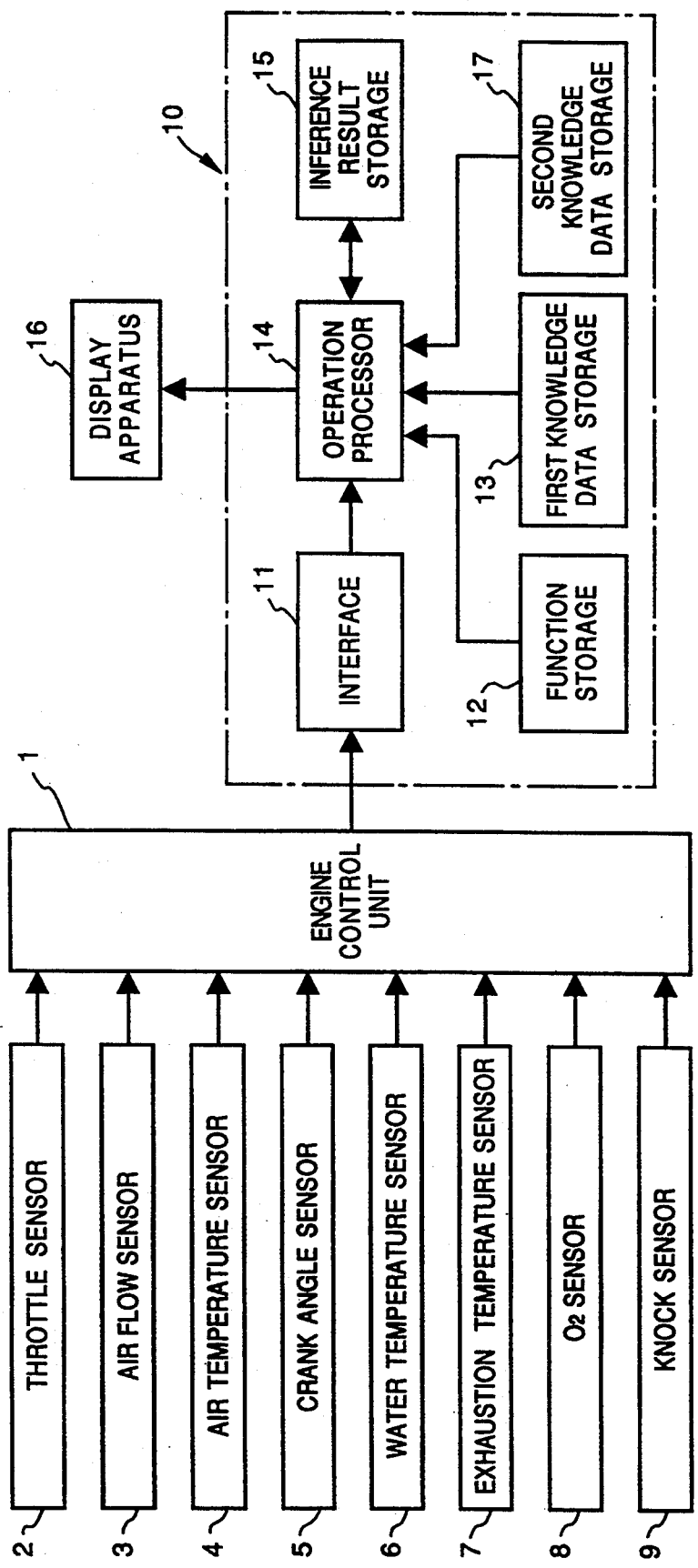
FIG. 23 is a block diagram illustrating the fault diagnosis system in the second embodiment.

In the first embodiment, only the knowledge indicating closeness of the nodes as shown in FIG. 11 (which is stored in the storage 13 of FIG. 1) is utilized. The second embodiment, shown in FIG. 23, differs from the first embodiment in utilizing a second knowledge data storage 17 which stores the rules of "superficial knowledge". Therefore, membership functions stored in the function storage 12 of the second embodiment are those shown in FIGS. 2–9. The knowledge of the first knowledge data storage 13 can be expressed as FIG. 11. The structure of the storage 15 which stores inference results is the same as that of the first embodiment.

The second data storage 17 stores ruled knowledge data that is experimental knowledge of automobile mechanic engineers, market information, and experienced problems for each automobile system. The second knowledge data storage 17 further stores a code of vehicle type corresponding to the pertinent vehicle.

Figure 24:
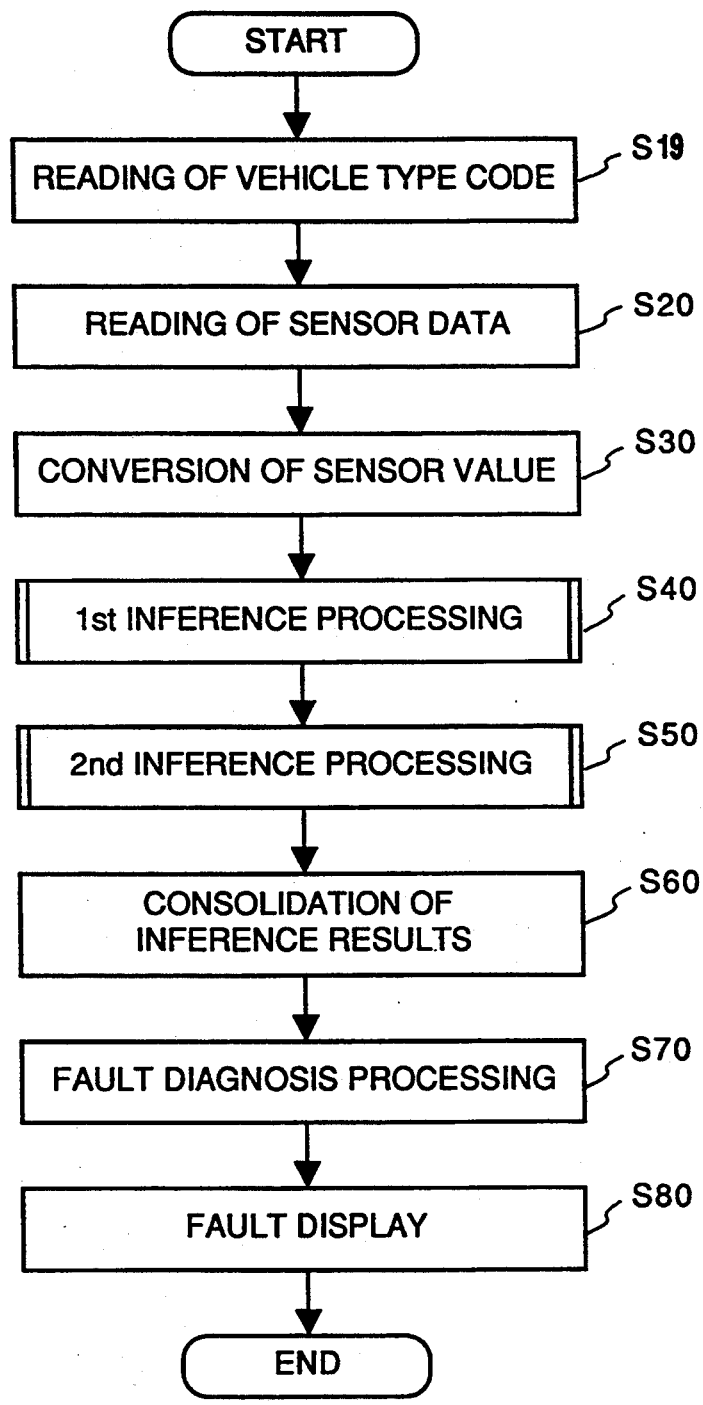
FIG. 24 is a flowchart illustrating the fault diagnosis processing of the second embodiment.

The fault diagnosis processing which is operated by the fault diagnosis unit 10 according to the second embodiment is explained along with the flowchart of FIG. 24.

The operation processor 14 in the fault diagnosis unit 10 reads the code of vehicle type at step S19 and the sensor values through the interface 11 at step S20. After that, these sensor values are converted to the membership values at step S30. Process in steps S20 and S30 are similar to those at steps S1 and S2 of the first embodiment.

Subsequently, the process proceeds to step S40 where the operation processor 14 executes a predetermined first inference processing. The first inference processing is substantially same as the process from step S4 to S10 of the first embodiment, except the rules are customized for each vehicle type.

Taking an example of the throttle sensor 2, the first inference will be described briefly.

The correlation coefficient, contained in a table as shown in FIG. 11, indicates the relationship between the throttle sensor 2 to the throttle subsystem A. The inference value of the throttle subsystem A is a value obtained by multiplying the membership value of the throttle sensor 2 by the correlation coefficient in accordance with the rule R1. Then, the correlation path is traced back and the weighting operations are performed as required. The obtained inference values are sequentially stored in the result table of the inference result storage 15 which is provided for every block. This process is executed until all series of correlation paths in which end points are the throttle sensor 2 have been processed. If the operation processor 14 judges that the inference operations to the sensors 2-9 are all completed, the inference values stored in the result table are "added" in every block (subsystem) and those values are added to the final result table in every block. This is the operation of the first inference process.

Returning to FIG. 24, the process proceeds to step S50 where the operation processor 14 executes a predetermined second inference processing where the membership values obtained at step 30 are compared with the data in the second knowledge data storage 17 and, if the pertinent inference value exists, a weighting calculation based on the inference rule is performed and an inference value is calculated.

Figure 25:
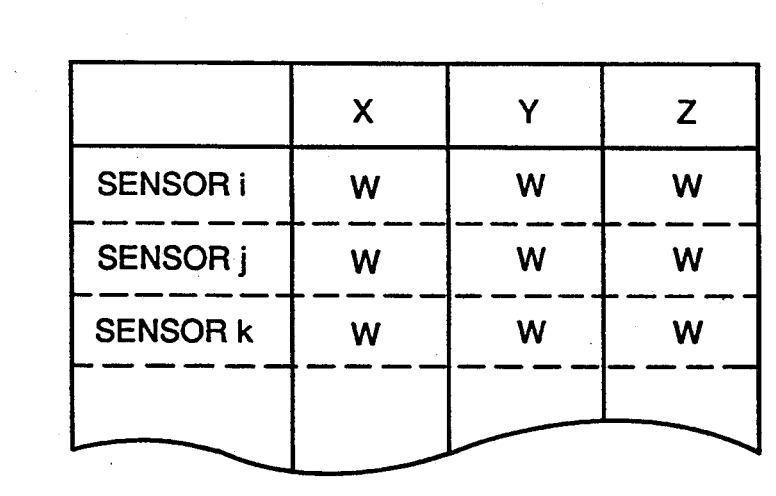

The structure of knowledge rule in the storage 17 is shown in FIG. 25. The knowledge rule expresses correlation between a sensor and subsystem in a form of a weighing coefficient. From the experience, as closeness of relationship between nodes is lower, the weighing coefficient is set lower. The weighting factors are attained from experiences of the mechanic engineers and information in the market. Failures may depend upon a type of vehicle and there is a failure which cannot occur in a certain type of vehicle. The coefficient of sensor node in which such failure cannot occur is set as "0".

At step S60, the operation processor 14 synthesizes the inference results by "adding" the inference results based on the first inference processing and second inference processing for every block. The synthesizing processing at step S60 can be performed by operating a "union" of the two fuzzy sets, namely by taking a bigger value. More specifically, if a result for the first inference exhibits "0.7" and a result for the second inference exhibits "0.2", the synthesized result is "0.7".

At step S70, the fault diagnosis processing is performed and the block indicating the largest added value is judged as fault and the result is displayed on the display apparatus 16 at step S80.

Third Embodiment

Figure 26:
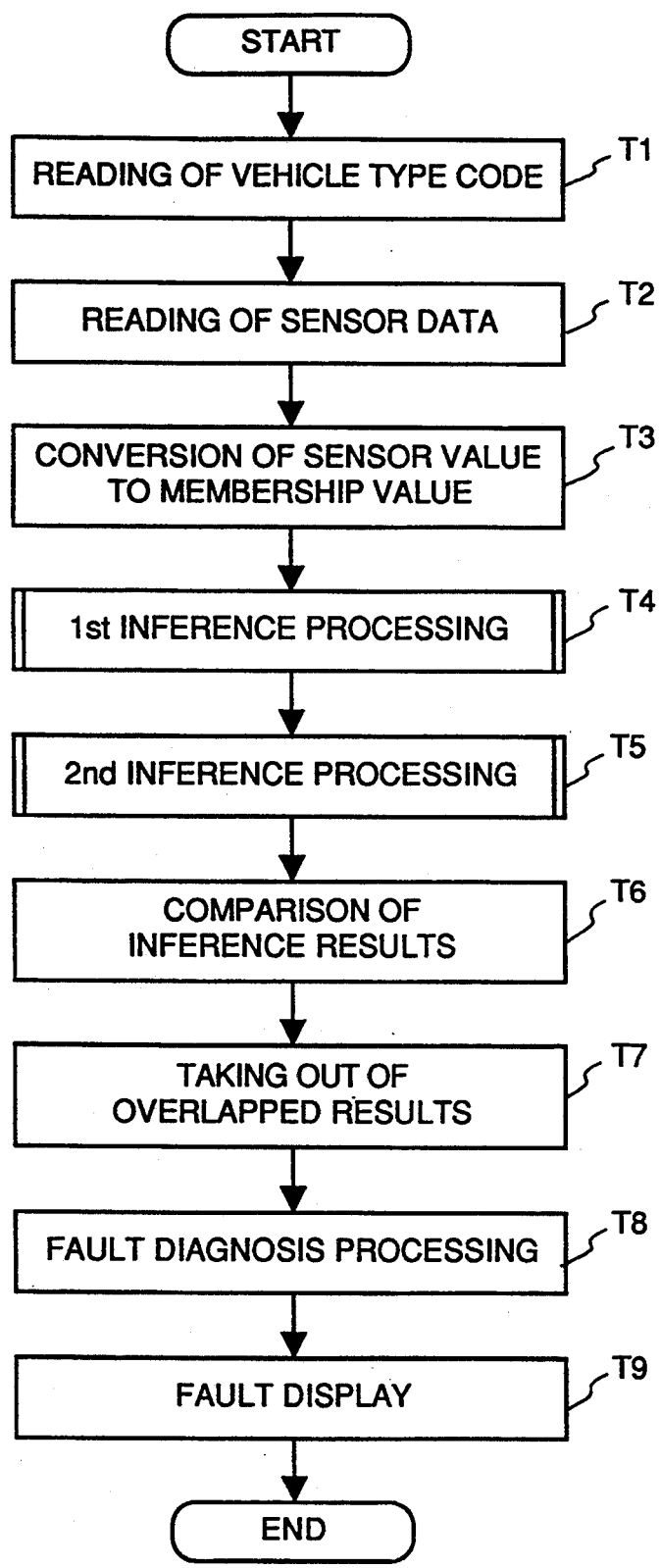
FIG. 26 is a flowchart illustrating the fault diagnosis processing of the third embodiment.

The fault diagnosis processing of the third embodiment is explained along with the flowchart of FIG. 26.

The operation processor 14 in the fault diagnosis unit 10 reads a code of vehicle type at step T1 and the sensor values through the interface 11 at step T2. After that, these sensor values are converted to the membership values at step T3.

The process proceeds to step T4 where the operation processor 14 executes the first inference processing which utilizes the first knowledge data storage 13. Then, the second inference processing which utilizes the second knowledge data storage 17 is executed at step T5. At step T6, the inference results attained by the first and second inference processing are compared, and an "intersection" of the two results is calculated. More specifically, if the first inference result indicates that subsystems A, B and C are faulty and the second inference result indicates that subsystems B, C and D are faulty, the "intersection" in which both the results commonly indicate as faulty indicates B and C.

After the "intersection" is calculated at step T7, the fault diagnosis processing is performed and the largest value in the list is judged as fault at step T8. Then, the result of the fault diagnosis is displayed on the display apparatus 16 at step T9. In the case of a fault diagnosis, there is a priority in the inference result attained by the first inference processing. The processing at step T7 is performed by operating an intersection of the two fuzzy sets.

It can be arranged such that, in the case where it is judged as failure, the process can be transferred to the fail safe mode.

Fourth Embodiment

Figure 27:
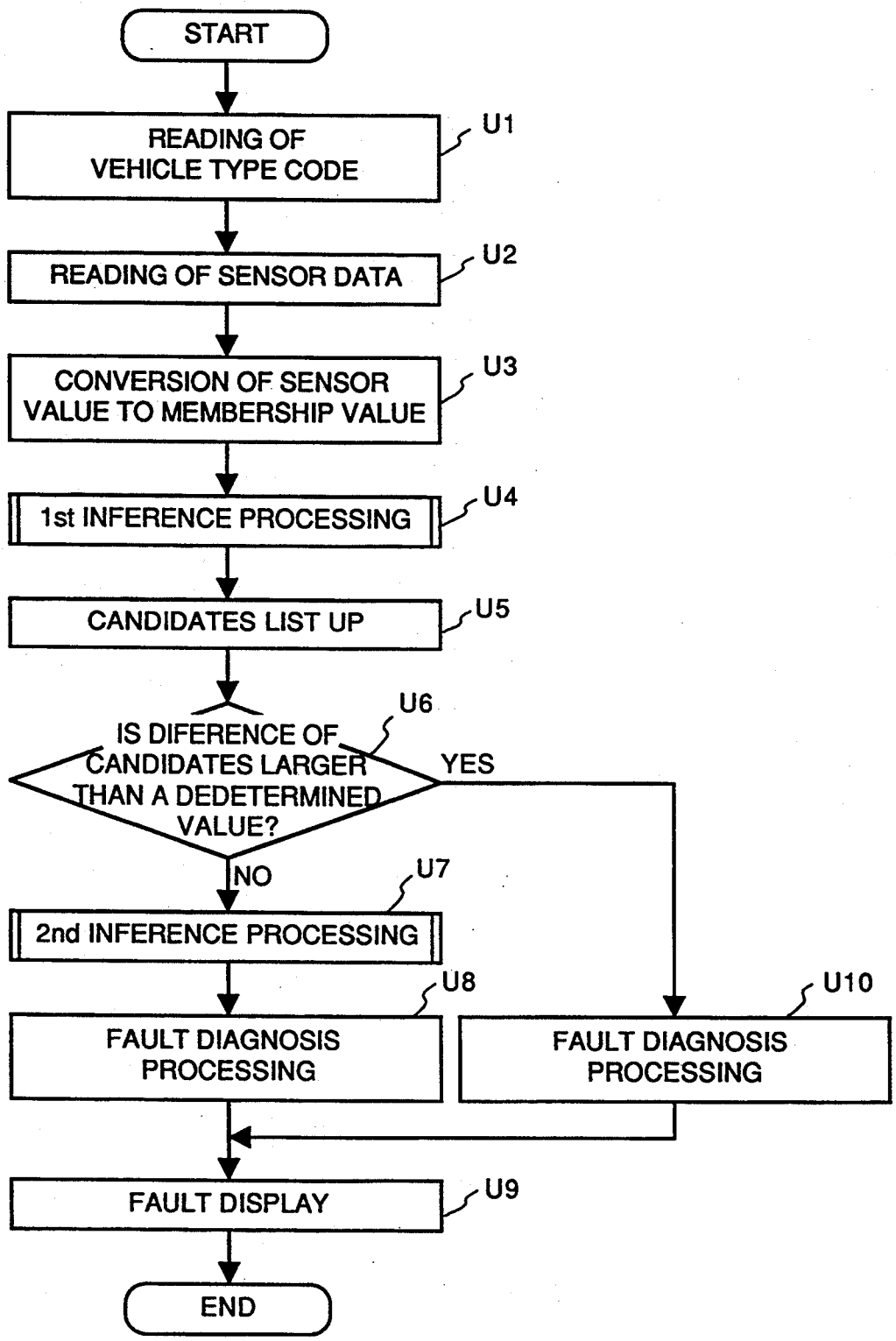
FIG. 27 is a flowchart illustrating the fault diagnosis processing of the fourth embodiment.

The fault diagnosis according to the fourth embodiment is explained along with the flowchart of FIG. 27.

The operation processor 14 in the fault diagnosis unit 10 reads a code of vehicle type at step U1 and the sensor values through the interface 11 at step U2. After that, these sensor values are converted to the membership values at step U3.

The process proceeds to step U4 where the operation processor 14 executes the first inference processing which utilizes the first knowledge data storage 13 and several candidates are selected in descendent order from the inference result which is obtained at step U5. At step U6, it is judged whether or not the difference between the two candidates is larger than the predetermined value. If it is judged as "NO", the process proceeds to step U7 where the second inference processing which utilizes the second knowledge data is executed. At step U8, the fault diagnosis processing is performed and the largest inference values among the inference result is judged as fault. At step U9, the fault diagnosis is displayed on the display apparatus 16.

On the other hand, in the case where it is judged as YES at step U6, the process proceeds to step U10 where the operation processor 14 executes a fault diagnosis processing which specifies the failed part among the candidates listed at step U5.

Modification

Apparently, it is easy to diagnose whether sensors are faulty because the diagnosis can be made on the basis of the output signals of the sensors. Micro computers are easy unit to determine whether they are faulty, because they have their own diagnosing logic. On the other hand, it is difficult determined whether mechanical parts which are functional are faulty. Therefore, in order to shorten the inference time in step S6, the inference operation can be limited to mechanically functional parts.

As many apparently widely different embodiments of the present invention can be made without departing from the spirit and scope thereof, it is to be understood that the invention is not limited to the specific embodiments thereof except as defined in the appended claims.

What is claimed is:

1. A fault diagnosis method for diagnosing an apparatus comprising a plurality of sensor nodes and a plurality of part nodes which are directly or indirectly associated with said plurality of sensor nodes, comprising the steps of:
   a) before fault diagnosis,
      a1) setting linkages based on deliveries of signals among said plurality of sensor nodes and said plurality of part nodes, and establishing weighing factors indicating correlations between said plurality of sensor nodes and said plurality of part nodes forming the linkages;
      a2) classifying said plurality of sensor nodes and said plurality of part nodes into a plurality of subsystems;
   b) during fault diagnosis:
      b1) collecting output signals of said plurality of sensor nodes;
      b2) converting the collected output signals of the plurality of sensor nodes to state quantities indicating degree of abnormal operation of the plurality of sensor nodes;
      b3) calculating state quantities indicating an abnormal operation of respective part nodes having a linkage with respective sensor nodes;
      b4) consolidating the state quantities for the plurality of sensor nodes and the plurality of part nodes obtained at steps b2 and b3 for each of said plurality of subsystems; and
      b5) performing fault diagnosis on said plurality of sensor nodes and the plurality of part nodes on the basis of the consolidated results of step b4, wherein a state quantity value is used as a basis for fault diagnosis.

2. The method according to claim 1, wherein said state quantities are represented in a form of a membership function of fuzzy reasoning.

3. The method according to claim 1, wherein said plurality of sensor nodes and said plurality of part nodes have connecting data comprising:
   identifying data indicating sensor nodes and part nodes which are connected to each sensor node and part node; and
   a weighing factor indicating a degree of correlation between the connected nodes.

4. The method according to claim 1, wherein the calculation of the state quantities in step b3 comprises the steps of:
   b3-1: starting from a sensor node which is included in a subsystem and determining the state quantity of said sensor node;
   b3-2: multiplying the state quantity of said sensor node by a weighing factor which is set for the linkage between said sensor node and the part node connected thereto, and storing the result as the state quantity of said connected part node; and b3-3: repeating b3-2 for each part node which is connected to said sensor node.

5. The method according to claim 4, wherein step b3 further comprises the steps of:
b3-4: checking whether or not the calculation of the state quantity on the linkage to which a sensor node is connected is going to be performed a second time; and
b3-5: ending the calculation operation for the subsystem, if it is discriminated that the calculation operation is going to be performed the second time.

6. The method according to claim 4, wherein, when the state quantity for a sensor node, determined in step b3-1, is detected as being smaller than a predetermined value, step b3-2 is not performed.

7. The method according to claim 4, wherein, said step b3-1 comprises the steps of:
performing said calculation operation starting from a sensor node indicating a larger value of state quantity, and
ending step b3 when the sensor node is found indicating a state quantity which is less than a predetermined value.

8. The method according to claim 1, wherein the calculation result for each part per every sensor is summed up at step b4.

9. The method according to claim 1, wherein a sensor node or part node having a state quantity over a predetermined threshold is inferred as being a faulty sensor node or part node at step b5.

10. The method according to claim 9, wherein, the faulty sensor node or part node which is inferred at step b5 is displayed as faulty.

11. The method according to claim 10, wherein sensor nodes and part nodes are displayed by predetermined symbols, linkages between the nodes are displayed by lines, and the faulty part inferred at step b5 and its associated linkages to sensor nodes with high state quantities are displayed in forms which are different from displays for normally functioning sensor nodes and part nodes.

12. The method according to claim 1, wherein said sensor nodes are connected to a communication path and the outputs of the sensor nodes are collected via the communication path.

13. A fault diagnosis method for diagnosing an apparatus system which comprises a plurality of sensor nodes and a plurality of part nodes which are directly or indirectly associated with the plurality of sensor nodes, comprising the steps of:
a) before fault diagnosis,
a1) setting linkages based on deliveries of signals among said plurality of sensor nodes and said plurality of part nodes, establishing weighing factors indicating correlations between any of the plurality of sensor nodes and plurality of part nodes forming the linkages, and assigning fault information on the basis of experiences to each sensor and part node;
a2) classifying said plurality of sensor nodes and said plurality of part nodes into a plurality of subsystems;
b) at fault diagnosis time:
b1) collecting output signals of said plurality of sensor nodes;
b2) converting the collected output signals of the sensor nodes to state quantities indicating a degree of abnormality of the sensor nodes;
b3) inferring a faulty state of a sensor node by calculating a state quantity indicating a state of abnormality for every sensor node along with the linkages, while calculating a state quantity for part nodes on the basis of said sensor state quantity indicating the state of abnormality;
b4) processing the two results, obtained in step b3 for their respective subsystems; and
b5) performing fault diagnosis on said plurality of sensor nodes and part nodes on the basis of the processed results of step b4.

14. The method according to claim 13, wherein step b4 further comprises determining an intersection between the two results to identify the faulty node.

15. The method according to claim 13, wherein, said step b4 further comprises the steps of:
narrowing down probable faulty nodes on the basis of one inference result of the two inference results of step b3, and
applying the narrowed down result to the other inference result of b3.

16. The method according to claim 13, wherein the processing of the two results in step b4 comprises the step of summing the state quantity of a sensor node and the state quantity of an associated part node.

* * * * *

UNITED STATES PATENT AND TRADEMARK OFFICE
CERTIFICATE OF CORRECTION

PATENT NO. : 5,414,645

DATED : May 9, 1995

INVENTOR(S) : Seiyo HIRANO, et al.

It is certified that error appears in the above-indentified patent and that said Letters Patent is hereby corrected as shown below:

Column 2, line 9, "forming" should be --form--;

Column 10, line 48, delete "the" .

Signed and Sealed this

Fourteenth Day of November, 1995

Attest:

BRUCE LEHMAN

Attesting Officer    Commissioner of Patents and Trademarks